United States Patent
Twardowska et al.

(10) Patent No.: US 6,974,848 B2
(45) Date of Patent: Dec. 13, 2005

(54) LOW-DENSITY THERMOSETTING SHEET MOLDING COMPOUNDS

(76) Inventors: Helena Twardowska, 5948 Northcliff Blvd., Dublin, OH (US) 43016; Laurence G. Dammann, 2437 Wynbend Blvd., Powell, OH (US) 43065; Dennis H. Fisher, 146 Spring Hollow La., Westerville, OH (US) 43081

( * ) Notice: Subject to any disclaimer, the term of this patent is extended or adjusted under 35 U.S.C. 154(b) by 216 days.

(21) Appl. No.: 10/123,513

(22) Filed: Apr. 16, 2002

(65) Prior Publication Data

US 2003/0199625 A1 Oct. 23, 2003

(51) Int. Cl.$^7$ ................................................ C08K 11/04
(52) U.S. Cl. ...................... 524/81; 524/401; 524/442; 524/445
(58) Field of Search .................... 524/445, 81, 442, 524/401

(56) References Cited

U.S. PATENT DOCUMENTS

| | | | |
|---|---|---|---|
| 4,172,059 A | 10/1979 | Atkins et al. ................. | 260/22 |
| 4,207,282 A | 6/1980 | Grisch ........................ | 264/257 |
| 4,622,354 A | 11/1986 | Iseler et al. ................. | 523/527 |
| 4,810,734 A | 3/1989 | Kawasumi et al. ......... | 523/216 |
| 5,102,948 A | 4/1992 | Deguchi et al. ............. | 524/789 |
| 5,376,604 A | 12/1994 | Iwasaki et al. ............. | 501/146 |
| 5,585,439 A | 12/1996 | Lee et al. .................... | 525/178 |
| 5,853,886 A | 12/1998 | Pinnavaia et al. .......... | 428/403 |
| 5,876,812 A | 3/1999 | Frisk et al. ................. | 428/35.7 |
| 6,287,992 B1 | 9/2001 | Polansky et al. ............. | 442/59 |

OTHER PUBLICATIONS

Doctoral Thesis of Paul Thomas Kelly, "Preparation, Characterization and Properties of Montmorillonite/Epoxy Compounds", Jan. 1994, Case Western Reserve University.

*Primary Examiner*—Edmund H. Lee
(74) *Attorney, Agent, or Firm*—David L. Hedden

(57) ABSTRACT

This invention relates to low-density thermosetting sheet molding compounds (SMC) including a treated inorganic clay, a curative, a low profile agent, a reinforcing agent, and preferably a low-density filler. The thermosetting SMC are used to prepare exterior and structural thermoset articles, e.g. auto parts, panels, etc.

21 Claims, No Drawings

DOCTYPE html>
LOW-DENSITY THERMOSETTING SHEET MOLDING COMPOUNDS

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to low-density thermosetting sheet molding compounds (SMC) comprising a treated inorganic clay, a thermosetting resin, a low profile agent, a reinforcing agent, and preferably a low-density filler. The thermosetting SMC are used to prepare exterior and structural thermoset articles, e.g. auto parts, panels, etc.

(2) Description of the Related Art

A molded composite article is a shaped, solid material that results when two or more different materials having their own unique characteristics are combined to create a new material, and the combined properties, for the intended use, are superior to those of the separate starting materials. Typically, the molded composite article is formed by curing a shaped sheet molding compound (SMC), which comprises a fibrous material, e.g. glass fibers, embedded into a polymer matrix. While the mechanical properties of a bundle of fibers are low, the strength of the individual fibers is reinforced by the polymer matrix that acts as an adhesive and binds the fibers together. The bound fibers provide rigidity and impart structural strength to the molded composite article, while the polymeric matrix prevents the fibers from separating when the molded composite article is subjected to environmental stress.

The polymeric matrix of the molded composite article is formed from a thermoplastic or thermosetting resin, which is mixed with fibers used to make a SMC. Thermoplastic polymers "soften" when heated, and recover their plastic properties when cooled. This reversible process can often be repeated many times. The polymers are thermoplastic because they are not chemically cross-linked. Examples of thermoplastic resins include linear polyethylene, polystyrene, acrylic resins, and nylon.

Thermosetting polymers "set" irreversibly by a curing reaction, and do not soften or melt when heated. The reason they do not soften or melt when they are heated is that they chemically cross-link when they are cured. Examples of thermosetting resins include phenolic resins, unsaturated polyester resins, polyurethane-forming resins, and epoxy resins.

Although molded composite article made from SMC based on thermosetting polymers typically have good mechanical properties and surface finish, this is achieved by loading the SMC with high levels of filler. These fillers, however, add weight to the SMC, which is undesirable, particularly when they are used to make automotive or parts of other vehicles that operate on expensive fuels. Therefore, there is an interest in developing SMC that will provide molded composite articles with good mechanical properties that have lower density, in order to improve fuel efficiency.

Additionally, the use of high levels of filler is particularly a problem when highly reactive unsaturated polyesters are used as the thermosetting polymer for making composites. Molded composite articles made from SMC formulations, which employ high reactivity unsaturated polyester resins, often shrink during cure. The shrinkage is controlled with low profile additives (LPA's) and large amounts of fillers, e.g. calcium carbonate, and kaolin clay. Although the resulting molded composite articles have good strength and surface appearance, the density of the composite is high, typically 1.9–2.0 g/cm$^3$. Thus, when used in applications, such as automotive body parts, the added weight lowers fuel efficiency.

U.S. Pat. No. 6,287,992 relates to a thermoset polymer composite comprising an epoxy vinyl ester resin or unsaturated polyester matrix having dispersed therein particles derived from a multi-layered inorganic material, which possesses organophilic properties. The dispersion of the multi-layered inorganic material with organophilic properties in the polymer matrix is such that an increase in the average interlayer spacing of the layered inorganic material occurs to a significant extent, resulting in the formation of a nanocomposite. Although the patent discloses polymer composites, it does not disclose molded composite articles and their mechanical properties, e.g. tensile strength (psi), modulus (ksi), elongation (%), and heat distortion temperature (° C.), nor does it disclose the manufacture of SMC that contains a reinforcing agent, a LPA, and a filler. The problem with using the SMC of the '992 patent is that molded articles prepared with the SMC experience significant shrinkage and are subject to significant internal stress, resulting in the formation of cracks in molded articles.

U.S. Pat. No. 5,585,439 discloses SMC made with an unsaturated polyester resin, and teaches that the mechanical properties of the SMC can be improved if a low profile additive (LPA) is added to the SMC. However, this patent does not teach or suggest the use of nanocomposites in the SMC. The problem with the SMC disclosed in the '439 patent is that when LPA's are used alone, without large amounts of filler (e.g. calcium carbonate and kaolin clay), the molded articles prepared from them have micro and macro voids, which results in molded articles having very low strength. Thus, large amounts of conventional fillers, in addition to LPA's, are required to obtain good strength and surface appearance of molded articles.

All citations referred to under this description of the "Related Art" and in the "Detailed Description of the Invention" are expressly incorporated by reference.

BRIEF SUMMARY OF THE INVENTION

This invention relates to a thermosetting sheet molding composition that will produce molded articles having a density of 1.1 g/cm$^3$ to 1.7 g/cm$^3$, wherein said composition comprises:

(a) a treated inorganic clay, (b) a thermosetting resin, (c) a low profile additive;

(d) a reinforcing agent; and preferably (e) a filler, more preferably a low-density filler. For purposes of describing this invention, a low-density molded article made from SMC means one that has a density of from 1.1 g/cm$^3$ to 1.7 g/cm$^3$, preferably from 1.1 g/cm$^3$ to 1.4 g/cm$^3$. The invention also relates to molded articles having a density of from 1.1 g/cm$^3$ to 1.7 g/cm$^3$, preferably from 1.1 g/cm$^3$ to 1.4 g/cm$^3$ prepared from the SMC.

Molded articles made from the SMC have good mechanical properties, surface finish, and do not shrink. The modulus of the molded articles typically ranges from 750,000 psi to 2 million psi, and is preferably greater than 1 million psi. The molded articles are dimensionally accurate, because the incorporation of the nanoclay reduces thermal expansion and contraction. The ranges for shrinkage and thermal expansion are typically from −1 to +1 mils/in, preferably from −0.5 to +0.75 mils/in, and most preferably from 0 to +0.5 mils/in. The surface is smooth and does not have bubbles or cracks. When measured by the LORIA® (surface analyzer (which will be described in more detail later), the index obtained from the surface analyzer (which is a measure of surface quality) is less than 150, preferably less than 100.

These properties are achieved in the molded articles, although the density of the SMC is atypically low. Because articles made with the low-density SMC are lighter, vehicles made from them are more fuel-efficient. The level of high-density fillers, e.g. calcium carbonate, talc, kaolin, carbon, silica, and alumina, can be reduced or eliminated.

The thermosetting SMC are used to prepare exterior or structural thermoset articles, e.g. auto parts, panels, etc.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention that enable one skilled in the art to practice the invention, including the best mode. It is contemplated that many equivalent embodiments of the invention will be operable besides these specifically disclosed.

Any treated inorganic clay can be used to practice this invention. The term "treated inorganic clay" is meant to include any layered clay having inorganic cations replaced with organic molecules, such as quaternary ammonium salts. See U.S. Pat. No. 5,853,886 for a description of various methods of preparing treated clay.

Typically, treated inorganic clays are prepared from layered inorganic clays such as phyllosilicates, e.g. montmorillonite, nontronite, beidellite, volkonskoite, hectorite, saponite, sauconite, magadiite, and kenyaite; vermiculite; and the like. Other representative examples include illite minerals such as ledikite; the layered double hydroxides or mixed metal hydroxides; chlorides. Other layered materials or multi-layer aggregates having little or no charge on the surface of the layers may also be used in this invention provided they can be intercalated to expand their interlayer spacing. Mixtures of one or more such materials may also be employed.

Preferred layered inorganic clays are those having charges on the layers and exchangeable ions such as sodium, potassium, and calcium cations, which can be exchanged, preferably by ion exchange, with ions, preferably cations such as ammonium cations, or reactive organosilane compounds, that cause the multi-lamellar or layered particles to delaminate or swell. The most preferred layered inorganic clay is montmorillonite.

The treated inorganic clay can be prepared by ion exchange in a separate step. This method first involves "swelling" clay with water or some other polar solvent, and then treating it with an intercalating agent. The function of the intercalating agent is to increase the "d-spacing" between the layers of the inorganic clay. The organophilic clay is then isolated and dried.

The treated clays can also be prepared in situ without ion exchange. The in situ treated clay is prepared by mixing a layered inorganic clay with a monomer or resin that facilitates intercalation, and an intercalating agent. In these treated clays, the cations replaced by the intercalating agent remain in the mixture.

Examples of monomers that can be used to facilitate intercalation include acrylic monomers, styrene, vinyl monomers (e.g. vinyl acetate), isocyanates (particularly organic polyisocyanates), polyamides, and polyamines. Examples of resins that can be used to facilitate intercalation include phenolic resins (e.g. phenolic resole resins; phenolic novolac resins; and phenolic resins derived from resorcinol, cresol, etc.); polyamide resins; epoxy resins, e.g. resins derived from bisphenol A, bisphenol F, or derivatives thereof, epoxy resins derived from the diglycidyl ether of bisphenol A or a polyol with epichlorohydrin; polyfunctional amines, e.g., polyalkylenepolyamine; and unsaturated polyester resins, e.g. reaction products of unsaturated dicarboxylic acids or their anhydrides and polyols. Examples of suitable unsaturated polyesters include the polycondensation products of (1) propylene glycol and maleic anhydride and/or fumaric acids; (2) 1,3-butanediol and maleic anhydride and/or fumaric acids; (3) combinations of ethylene and propylene glycols (approximately 50 mole percent or less of ethylene glycol) and maleic anhydride and/or fumaric acid; (4) propylene glycol, maleic anhydride and/or fumaric acid and saturated dibasic acids, such as o-phthalic, isophthalic, terephthalic, succinic, adipic, sebacic, methyl-succinic, and the like. Preferably, styrene is used to facilitate intercalation.

Although other intercalating agents can be used, preferably the intercalating agent is a quaternary ammonium salt. Typically, the quaternary ammonium salts (cationic surface active agents) have from 6 to 30 carbon atoms in the alkyl groups, e.g. alkyl groups such as octadecyl, hexadecyl, tetradecyl, dodecyl or like moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt and the like. The amount of quaternary ammonium salt can vary over wide ranges, but is typically used in amount sufficient to replace from 30 to 100 percent of the cations of the inorganic clay with the cations of the intercalating agent. Typically, the amount of quaternary ammonium salt is from 10 to 60 parts by weight based on 100 parts by weight of inorganic clay, and preferably form 20 to 40 parts by weight based on 100 parts by weight of inorganic clay. The quaternary ammonium salt can be added directly to the inorganic clay, but is preferably first mixed with the monomer and/or resin used to facilitate intercalation.

An in situ treated clay is preferred because of its lower cost and it allows flexibility of design when preparing SMC, i.e. the intercalating agent can be selected to match the structure of the resin and have functional groups reactive with the resin. Additionally, the amount of intercalating agent can be varied in the range 5–50% per weight of the clay to obtain desired properties. A greater amount of intercalating agent provides more complete dispersion of the clays. This can yield significant improvements in the molding formulation, such as improved mechanical properties and increased transparency leading to moldings more easily pigmented. Increased dispersion, however, also yields a significant increase in viscosity, which can lead to poor glass wet-out in the SMC sheet. Therefore, it is necessary to balance the amount of clay and intercalating agent with the viscosity increase. The use of "treated inorganic clays" and low total filler loadings also yields SMC sheet that flows more easily when molded. Mold pressure can often be reduced to as little as one-third of that used for standard SMC. Molding at lower pressures dramatically reduces stress and wear on the press and the mold and often gives improved surface quality for the molded part.

Although any thermosetting resin can be used in the SMC, preferably used are phenolic resins, unsaturated polyester resins, vinyl ester resins, polyurethane-forming resins, and epoxy resins.

Most preferably used as the thermosetting resin are unsaturated polyester resins. Unsaturated polyester resins are the polycondensation reaction product of one or more dihydric alcohols and one or more unsaturated polycarboxylic acids. The term "unsaturated polycarboxylic acid" is meant to include unsaturated polycarboxylic and dicarboxylic acids; unsaturated polycarboxylic and dicarboxylic anhydrides; unsaturated polycarboxylic and dicarboxylic acid halides; and unsaturated polycarboxylic and dicarboxylic esters. Specific examples of unsaturated polycarboxylic acids include maleic anhydride, maleic acid, and fumaric acid. Mixtures of unsaturated polycarboxylic acids and saturated polycarboxylic acids may also be used. However, when such mixtures are used, the amount of unsaturated polycarboxylic acid typically exceeds fifty percent by weight of the mixture.

Examples of suitable unsaturated polyesters include the polycondensation products of (1) propylene glycol and maleic anhydride and/or fumaric acids; (2) 1,3-butanediol and maleic anhydride and/or fumaric acids; (3) combinations of ethylene and propylene glycols (approximately 50 mole percent or less of ethylene glycol) and maleic anhydride and/or fumaric acid; (4) propylene glycol, maleic anhydride and/or fumaric acid and saturated dibasic acids, such as o-phthalic, isophthalic, terephthalic, succinic, adipic, sebacic, methyl-succinic, and the like. In addition to the above-described polyester one may also use dicyclopentadiene modified unsaturated polyester resins as described in U.S. Pat. No. 3,883,612. These examples are intended to be illustrative of suitable polyesters and are not intended to be all-inclusive. The acid number to which the polymerizable unsaturated polyesters are condensed is not particularly critical with respect to the ability of the low-profile resin to be cured to the desired product. Polyesters, which have been condensed to acid numbers of less than 100 are generally useful, but acid numbers less than 70, are preferred. The molecular weight of the polymerizable unsaturated polyester may vary over a considerable range, generally those polyesters useful in the practice of the present invention having a molecular weight ranging from 300 to 5,000, and more preferably, from about 500–5,000.

The SMC formulation preferably contains an ethylenically unsaturated (vinyl) monomer, which copolymerizes with the unsaturated polyester. Examples of such monomers include acrylate, methacrylates, methyl methacrylate, 2-ethylhexyl acrylate, styrene, divinyl benzene and substituted styrenes, multi-functional acrylates and methacrylates such as ethylene glycol dimethacrylate or trimethylol propanetriacrylate. Preferably used as the ethylenically unsaturated monomer is styrene. The ethylenically unsaturated monomer is usually present in the range of about 5 to 50 parts per 100 parts by weight, based upon the weight of the unsaturated resin, low profile additive, and the unsaturated monomer, preferably 20 to about 45 parts per 100 parts by weight, and more preferably from about 35 to about 45 parts per 100 parts by weight. The vinyl monomer is incorporated into the composition generally as a reactive diluent for the unsaturated polyester.

The low profile additive (LPA) is added to the formulation as aid to reduce the shrinkage of molded articles prepared with the SMC. The LPA's used in the SMC are typically thermoplastic resins. Examples of suitable LPA's include saturated polyesters, polystyrene, urethane linked saturated polyesters, polyvinyl acetate, polyvinyl acetate copolymers, acid functional polyvinyl acetate copolymers, acrylate and methacrylate polymers and copolymers, homopolymers and copolymers include block copolymers having styrene, butadiene and saturated butadienes e.g. polystyrene.

The SMC contains a reinforcing agent, preferably a fibrous reinforcing agent. Fibrous reinforcing agents are added to the SMC to impart strength and other desirable physical properties to the molded articles formed from the SMC. Examples of fibrous reinforcements that can be used in the SMC include glass fibers, asbestos, carbon fibers, polyester fibers, and natural organic fibers such as cotton and sisal. Particularly useful fibrous reinforcements include glass fibers which are available in a variety of forms including, for example, mats of chopped or continuous strands of glass, glass fabrics, chopped glass and chopped glass strands and blends thereof. Preferred fibrous reinforcing materials include 0.5, 1, and 2-inch fiberglass fibers.

The SMC preferably contains a low-density filler. A low-density filler is a filler having a density of 0.5 g/cm$^3$ to 1.7 g/cm$^3$, preferably from 0.7 g/cm$^3$ to 1.3 g/cm$^3$. Examples of low-density fillers include diatomaceous earth, hollow microspheres, ceramic spheres, and expanded perlite and vermiculate.

Although not necessarily preferred, particularly in major amounts, higher-density fillers, such as calcium carbonate, talc, kaolin, carbon, silica, and alumina may be also added to the SMC.

The thermosetting sheet molding compositions comprise (a) from about 30 to 50 parts of thermosetting resin, preferably from about 35 to 45 parts; (b) from about 1 to 10 of treated inorganic clay, preferably from about 2 to 6 parts; (c) from about 10 to 40 parts of low profile additive (preferably as a 50% solution in styrene), preferably from about 15 to 30 parts; (d) from 15 to 40 parts of fiber glass, preferably from about 25 to 35 parts; and (e) from 0 to 35 parts of an inorganic filler, preferably from about 20 to 30 parts, where the parts are based upon 100 parts of the SMC resin formulation.

The SMC also preferably contains an organic initiator. The organic initiators are preferably selected from organic peroxides which are highly reactive and decomposable at the desired temperature and having the desired rate of curing. Preferably, the organic peroxide is selected from those, which are decomposable at temperatures from about 50° C. to about 120° C. The organic peroxides to be used in the practice of the invention are typically selected from tertiary butyl peroxy 2-ethylhexanoate; 2,5-dimethyl-2,5-di(-benzoylperoxy)cyclohexane; tertiary-amyl 2-ethylhexanoate and tertiary-butyl isopropyl carbonate;

tertiary-hexylperoxy 2-ethylhexanoate; 1,1,3,3-tetramethylbutylperoxy 2-ethylhexanoate; tertiary-hexylperoxypivalate; tertiarybutylperoxy pivalate; 2,5-dimethyl-2,5-di(2-ethylhexanoylperoxy) cyclohexane; dilauroyl peroxide; dibenzoyl peroxide; diisobutyryl peroxide; dialkyl peroxydicarbonates such as diisopropyl peroxydicarbonate, di-n-propyl peroxydicarbonate, di-sec-butyl peroxydicarbonate, dicyclohhexyl peroxydicarbonate; VAZ052, which is 2,2'-azobis(2,4-dimethyl-valeronitrile); di-4-tertiarybutylcyclohexyl peroxydicarbonate and di-2 ethylhexyl peroxydicarbonate and t-butylperoxy esters, such as tertiary butylperpivalate and teriarybutylper pivalate and eodecanoate. More preferably, the initiators are di-(4-tert-butyl-cyclohexyl) peroxydicarbonate and dibenzoyl peroxide. Most preferably, the initiator is dibenzoyl peroxide used as a solution or a paste rather than in dry form. The initiators are used in a proportion that totals from about 0.1 parts to about 8 parts per 100 parts by weight, preferably from about 0.1 to about 5 parts per 100 parts by weight, and more preferably from about 0.1 to about 4 parts per 100 parts by weight.

The SMC may also contain a stabilizer or inhibitor. The stabilizers preferably are those having high polymerization inhibiting effect at or near room temperature. Examples of suitable stabilizers include hydroquinone; toluhydroquinone; di-tertiarybutylhydroxytoluene (BHT); para-tertiarybutylcatechol (TBC); mono-tertiarybutylhydroquinone (MTBHQ); hydroquinone monomethyl ether; butylated hydroxyanisole (BHA); hydroquinone; and parabenzoquinone (PBQ). The stabilizers are used in a total amount ranging from about 0.1 to about 4.0 parts per 100 parts, preferably from about 0.1 to about 3.0 parts per 100 parts and more preferably from about 0.1 to about 2 parts by weight per 100 parts by weight of the unsaturated polyester.

The sheet molding composition may further include a thickening agent such as oxides, hydroxides, and alcoholates of magnesium, calcium, aluminum, and the like. The thickening agent can be incorporated in a proportion ranging from about 0.05 parts to about 5 parts per 100 parts by weight, based on the weight of the unsaturated polyester resin, preferably from about 0.1 parts to about 4 parts per 100 parts by weight and more preferably, from about 1 part to about 3 parts per 100 parts by weight. Additionally or alternatively, the SMC may contain isocyanate compounds and polyols or other isocyanate reactive compounds, which may be used to thicken the SMC.

The SMC may also contain other additives, e.g. cobalt promoters (Co), nucleating agents, lubricants, plasticizers, chain extenders, colorants, mold release agents, antistatic agents, pigments, fire retardants, and the like. The optional additives and the amounts used depend upon the application and the properties required.

The SMC are useful for preparing molded articles, particularly sheets and panels. The sheets and panels may be shaped by conventional processes such as vacuum processing or by hot pressing. The SMC are cured by heating, contact with ultraviolet radiation, and/or catalyst, or other appropriate means. The sheets and panels can be used to cover other materials, for example, wood, glass, ceramic, metal, or plastics. They can also be laminated with other plastic films or other protective films. They are particularly useful for preparing parts for recreational vehicles, automobiles, boats, and construction panels.

Abbreviations

The following abbreviations are used:

| | |
|---|---|
| CL-10A = | a commercially treated clay from the Southern Clay Products, prepared by ion exchange using water as a swelling agent, and then treating with an with DMBTAC (intercalating agent), such that the weight ratio of CLNA/DMBTAC is about 70:30. |
| CLNA = | an untreated inorganic clay, which has not been treated with water or a quaternary ammonium salt (i.e. is not intercalated), commercially available from the Southern Clay Products. |
| In situ CLNA = | in-situ treated clay prepared from purified CLNA and VBDMO dissolved in styrene monomer, under conditions of high shear agitation to ensure good dispersion and intercalation of clay. |
| Dicalite PS | diatomaceous earth, a low-density filler. |
| LPA A59021 | AROPOL ™ Q6585 resin, a saturated polyester low profile additive at 50 weight percent in styrene, manufactured by Ashland Specialty Chemical, a division of Ashland Inc. |
| Sphericel 110P8 | glass microspheres having a wall thickness about 50% of their diameter manufactured by PQ Corporation. |
| TBPB | t-butylperoxy benzoate. |
| UPE | Polyester Q6585, unsaturated polyester resin manufactured by Ashland Specialty Chemical, a division of Ashland Inc. |
| VBDMO | 80% solution of vinylbenzyl dimethyl oleyl ammonium chloride in isopropanol, an intercalating agent. |
| DMBTAC | dimethyl benzyl tallow ammonium chloride. |

EXAMPLES

In this application, all units are in the metric system and all amounts and percentages are by weight, unless otherwise expressly indicated. In Examples A–C and 1–4, several SMC pastes were formed. Preliminary tests were conducted by molding the SMC pastes into test panels (Examples D, E, and 5–9) and curing them in a Carver Laboratory Press at about 150° C. Then the density of the molded plates was determined by measuring dimensions and weight. The shrinkage of the molded plates was determined by measuring dimensions of plates and cavities or frames. These preliminary tests, based on the paste, estimate how effective a SMC will be in making molded articles. In other tests (Examples F and 11–14), SMC were prepared by adding fiberglass to pastes (about 30–33 percent fiberglass by weight, based on the weight of the paste). Test plaques were prepared by forming the SMC on a 24-inch SMC machine and compression molding flat plaques at 150° C. and 1000 psi pressure for 2 minutes. The 12-inch by 12-inch test plaques were evaluated for cold part to cold mold shrinkage, surface quality (using a LORIA®[1] surface analyzer), and standard mechanical properties, such as tensile and flexural strength and moduli.

The LORIA surface analyzer is an instrument manufactured by Diffracto and described in U.S. Pat. No. 4,853,777. It measures surface quality and generates an index number that reflects surface quality. An index less than 65 indicates that the surface finish is excellent, an index of 65 to 85 indicates that the surface finish is very good, an index of 85 to 100 indicates that the surface finish is good, and an index of more than 100 indicates that the surface finish is satisfactory for structural applications where surface quality is not a primary concern.

Comparison Example A

SMC without LPA or Filler

An attempt was made to prepare a low-denisty SMC paste by mixing the following components using conventional mechanical stirrer. The formulation was molded and cured in a Carver Laboratory Press at 150° C.

| UPE | 65 g |
|---|---|
| Styrene | 7 g |
| Magnesium oxide thickener | 9 g |
| Zinc stearate mold release | 4.5 g |
| Tertiary butyl perbenzoate catalyst | 1.5 g |
| Co activator (12% solution) | 0.1 g |

The attempt failed because the shrinkage was so large that molded plate cracked into small Comparison Example B Addition of LPA to Additive to Example A The procedure of Example A is followed, except 28 grams of a LPA and 32.1 grams of a low-density filler are added to the to the UPE and styrene mixture. The formulation was molded and cured in a Carver Laboratory Press at 150° C. The molded composite was evaluated for density and shrinkage. The formulation is set forth in Table I and the test results are set forth in Table II.

Comparison Example C

Addition of High-Density Filler to Example B

The procedure of Example B was followed, except the low-density filler was replaced with 200 g of calcium carbonate. This formulation is a typical formulation used commercially. The SMC was molded and cured in a Carver Laboratory Press at 150° C. The molded composite was evaluated for density and shrinkage. The formulation is set forth in Table I and the test results are set forth in Table II.

Example 1

Substitution of In Situ Treated Clay for Filler of Example C

In this example, a treated clay formed in situ was substituted for the calcium carbonate filler. The treated clay was formed in situ by mixing VBDMO and CLNA with styrene and LPA mixture in the amounts indicated in Table II. The mixture was thoroughly mixed to ensure complete wetting to form an in situ treated inorganic clay. The unsaturated polyester resin was then added and mixed for about 30 minutes under high shear agitation to ensure complete exfoliation of the clay. Any air bubbles entrapped during mixing are removed by vacuum degassing or other appropriate methods. The remaining components of the SMC paste are added and thoroughly mixed. The resulting mixture has a viscosity of 30,000–40,000 cP, which is required for SMC processing. The viscosity can be controlled by varying the amount of treated clay, intercalating agent and low-density filler.

The SMC paste was molded into a test panel and cured in a Carver Laboratory Press at about 150° C. The molded panel was evaluated for density and shrinkage. The formulation is set forth in Table I and the test results are set forth in Table II.

Example 2

Addition of Low-Density Filler to SMC Formulation Containing In Situ Treated Clay The procedure of Example 1 was followed, except diatomaceous earth was added to the formulation. The SMC paste was molded into a test panel and cured in a Carver Laboratory Press at about 150° C. The molded panel was evaluated for density and shrinkage. The formulation is set forth in Table I and the test results are set forth in Table II.

Example 3

Addition of Low-Density Microspheres to SMC Formulation Containing in situ Treated Clay The procedure of Example 1 was followed, except Sphericel 110P8 glass microspheres were used instead of diatomaceous earth as the low-density filler. The SMC paste was molded into a test panel and cured in a Carver Laboratory Press at about 150° C. The molded panel was evaluated for density and shrinkage. The formulation is set forth in Table I and the test results are set forth in Table II.

Example 4

Addition of Koalin to SMC Formulation Containing In Situ Treated Clay

The procedure of Example 1 was followed, except kaolin, a high-density filler, was used instead of hollow microspheres. The SMC paste was molded into a test panel and cured in a Carver Laboratory Press at about 150° C. The molded panel was evaluated for density and shrinkage. The formulation is set forth in Table I and the test results are set forth in Table II.

TABLE I (Formulations for Examples B and C and 1–4)

| | Example | | | | | |
|---|---|---|---|---|---|---|
| Component (pbw) | B | C | 1 | 2 | 3 | 4 |
| UPE 65 | 65 | 65 | 65 | 65 | 65 | 65 |
| Styrene | 7 | 7 | 7 | 7 | 7 | 7 |
| LPA A59021 | 28 | 28 | 28 | 28 | 28 | 28 |
| CLNA | — | — | 14.3 | 6 | 12.9 | 12.1 |
| VBDMO | — | — | 3.6 | 1.5 | 4.6 | 4.6 |
| Calcium carbonate | — | 200 | — | — | — | — |
| Dicalite PS | 32.1 | — | — | 25 | — | — |
| Sphericel 110P8 | — | — | — | — | 32.1 | — |
| Kaolin clay SA 400 | — | — | — | — | — | 25 |

TABLE II (Test results/Density and Shrinkage)

| Example | SMC Paste | Density (g/cm³) | Shrinkage |
|---|---|---|---|
| D | B | 1.16 | Panel cracked |
| E | C | 1.85 | None |
| 5 | 1 | 1.06 | Some |
| 6 | 2 | 1.10 | None |
| 7 | 3 | 1.15 | None |
| 8 | 4 | 1.20 | None |

The data in Table I indicates that the test panels made from SMC pastes containing the treated clay (Examples 5–8) had low-density, yet had little or no shrinkage. They farther indicate that the addition of the low-density filler (Examples 6 and 7) further reduces shrinkage without adding significantly to the density of the test panel. Example 8 indicates that small amounts of high-density fillers can be used in the formulation without significantly adding to the density of the test panel.

Examples F and 9–11

Preparation of Molded Plaques from SMC Compositions Using a Commercially Available Treated Inorganic Clay Prepared by Ion Exchange SMC paste samples, as described in Table III, were formulated and processed according to Example 1. In additional examples, a commercially treated inorganic clay was used (CL-10A) and the results were the same as with in-situ treated clay. The SMC pastes were then combined on an SMC machine with inch-length chopped fiberglass roving to a 30–32% fiberglass content in the finished SMC. These SMC containing the fiberglass were then molded in a SMC hot press machine at 150° C. to form 100 mils thick plaques. The plaques were tested for surface quality using a LORIA surface analyzer, and the density was determined by measuring the plaque volume and weight. The density and surface quality results are summarized in Table IV. The test plaques were also subjected to physical and mechanical testing.

TABLE III (Compositions of SMC Formulations Processed in SMC Machine)

| | Example | | | |
|---|---|---|---|---|
| Component | F | 9 | 10 | 11 |
| UPE | 1000 | 1000 | 1000 | 1000 |
| Styrene | 108 | 108 | 108 | 108 |
| LPA | 431 | 431 | 431 | 431 |
| CLNA | — | 220 | 100 | 198 |
| VBDMO | — | 51 | 23 | 46 |
| Calcium carbonate | 3080 | — | — | — |
| Dicalite PS | — | — | 385 | — |
| Kaolin clay ASP 400 | — | — | — | 400 |
| Zn stearate | 69 | 69 | 69 | 69 |
| MgO thickener | 148 | 148 | 148 | 148 |
| TBPB | 23 | 23 | 23 | 23 |
| Co naphthanate (12% solution) | 1.5 | 1.5 | 1.5 | 1.5 |

TABLE IV (Density and surface appearance of panes made with SMC formulations)

| Example | Paste Used | Density (g/cm3) | Surface Appearance |
|---|---|---|---|
| G | F | 1.95 | excellent |
| 12 | 9 | 1.30 | good |
| 13 | 10 | 1.38 | very good to excellent |
| 14 | 11 | 1.38 | very good to excellent |

The data indicate that the test plaques made from the SMC containing the treated clays (Examples 12–14), with or without a small amount of other fillers, gave molded SMC formulations with densities lower than standard by 30–33%. The low-density formulations showed excellent processing characteristics and wetting of fiberglass. The thickening reaction was the same as with the standard formulation, i.e. the viscosity increased to the desired value and the plates were ready to mold in 2–3 days.

Furthermore, all molded test plaques had good dimensional stability and did not show shrinkage. The tensile strength and modulus of the test plaques made with the low-density formulations were comparable to those made from the high-density SMC formulation containing the calcium carbonate.

The surface appearance of the plaque made with the SMC formulation of Example F was excellent and suitable for all applications. The surface appearance of the plaque made with the SMC formulation of Example 9, which contained only treated clay fillers, had good surface appearance and is suitable for structural applications. The surface appearance of the plaques made with the SMC formulations of Examples 10 and 11 had a surface appearance significantly better than the surface appearance of the plaque made with the SMC formulation of Example 9, and were rated very good to excellent for structural applications, and good for exterior applications.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermosetting sheet molding composition that will produce molded articles having density of 1.1 g/cm3 to 1.7 g/cm3 comprising:
   (a) from 30 to 50 parts of a thermosetting resin;
   (b) from 1 to 10 parts of a treated inorganic clay;
   (c) from 10 to 40 parts of a low profile additive;
   (d) from 15 to 40 parts of fiber glass; and
   (e) from 0 to 35 parts of an inorganic filler,
   wherein said parts by weight are based on 100 parts of sheet molding composition.

2. The thermosetting molding composition of claim 1 wherein the treated clay is prepared in situ.

3. The thermosetting molding composition of claim 1 wherein the treated clay is prepared by ion exchange.

4. The thermosetting sheet molding composition of claim 2 or 3 which further comprises a filler.

5. The thermosetting sheet molding composition of claim 4 further comprising a fiberglass as a reinforcing agent wherein the reinforcing agent is fiberglass.

6. The thermosetting sheet molding composition of claim 5 wherein the filler is a low-density filler.

7. The thermosetting sheet molding composition of claim 6 wherein the thermosetting resin is selected from the group consisting of unsaturated polyester resins, vinyl ester resins, and mixtures thereof.

8. The thermosetting sheet molding composition of claim 7 wherein the unsaturated polyester resin has an average molecular weight of 500 to 5,000.

9. The thermosetting sheet molding composition of claim 8 which further contains an ethylenically unsaturated monomer.

10. The thermosetting sheet molding composition of claim 9 wherein the ethylenically unsaturated monomer is styrene.

11. The thermosetting sheet molding composition of claim 10 which further comprises an initiator, a stabilizer, and a thickening agent.

12. A thermoset molded article having a density of from 1.1 to 1.7 grams/cm$^3$ prepared by a process comprising:
   (a) introducing a thermosetting sheet molding composition comprising:
      (1) from 30 to 50 parts of a thermosetting resin;
      (2) from 1 to 10 parts of a treated inorganic clay;

(3) from 10 to 40 parts of a low profile additive;
(4) from 15 to 40 parts of fiber glass; and
(5) from 0 to 35 parts of an inorganic filler,
into a pattern, wherein said parts by weight are based on 100 parts of sheet molding composition;

(b) curing the shape prepared by (a).

13. The molded article of claim 12 wherein the treated clay is prepared in situ.

14. The molded article claim 12 wherein the treated clay is prepared by ion exchange.

15. The molded article of claim 14 further comprising a fiberglass as a reinforcing agent wherein the reinforcing agent is fiberglass.

16. The molded article of claim 15 wherein the filler is a low-density filler.

17. The molded article of claim 16 wherein the thermosetting resin is selected from the group consisting of unsaturated polyester resins, vinyl ester resins, and mixtures thereof.

18. The molded article of claim 17 wherein the unsaturated polyester resin has an average molecular weight of 500 to 5,000.

19. The molded article of claim 18 which further contains an ethylenically unsaturated monomer.

20. The molded article of claim 19 wherein the ethylenically unsaturated monomer is styrene.

21. The molded article of claim 20 which further comprises an organic peroxide initiator, a stabilizer, and a thickening agent.

* * * * *